US012356223B2

(12) United States Patent
Ito et al.

(10) Patent No.: US 12,356,223 B2
(45) Date of Patent: Jul. 8, 2025

(54) ABNORMALITY DETECTION APPARATUS, ABNORMALITY DETECTION METHOD AND NON-TRANSITORY COMPUTER READABLE MEDIUM

(71) Applicant: NEC Corporation, Tokyo (JP)

(72) Inventors: Umihiko Ito, Tokyo (JP); Kenji Kouno, Tokyo (JP); Toshiki Takeuchi, Tokyo (JP); Jun Sakai, Tokyo (JP); Taichi Ohtsuji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 366 days.

(21) Appl. No.: 17/801,313

(22) PCT Filed: Dec. 21, 2020

(86) PCT No.: PCT/JP2020/047712
§ 371 (c)(1),
(2) Date: Aug. 22, 2022

(87) PCT Pub. No.: WO2021/176805
PCT Pub. Date: Sep. 10, 2021

(65) Prior Publication Data
US 2023/0092448 A1    Mar. 23, 2023

(30) Foreign Application Priority Data
Mar. 2, 2020   (JP) ................................. 2020-034621

(51) Int. Cl.
*H04W 24/08*   (2009.01)
*H04B 17/309*   (2015.01)
(52) U.S. Cl.
CPC .......... *H04W 24/08* (2013.01); *H04B 17/309* (2015.01)

(58) Field of Classification Search
CPC ..... H04W 24/08; H04B 17/309; H04B 17/17; H04B 17/26; H04B 17/318
(Continued)

(56) References Cited

U.S. PATENT DOCUMENTS 8,073,641 B2 * 12/2011 Kazama ............. G01R 29/0871
702/65
10,261,178 B2 * 4/2019 Wu .......................... G01S 7/412
(Continued)

FOREIGN PATENT DOCUMENTS

JP   2011-160401 A   8/2011
JP   2012-047724 A   3/2012
(Continued)

OTHER PUBLICATIONS

Extended European Search Report for EP Application No. 20923068.9, dated on Jul. 12, 2023.
(Continued)

*Primary Examiner* — Eugene Yun

(57) ABSTRACT

An abnormality detection apparatus according to an example embodiment includes a reception unit for receiving radio waves, a feature amount extraction unit for extracting a plurality of feature amounts in a predetermined frequency band from the received radio waves, a recording unit for recording the plurality of extracted feature amounts and the frequency band in association with each other, and a processing unit for acquiring a plurality of feature amounts in a predetermined range from the plurality of accumulated feature amounts, determining whether or not the acquired feature amounts fall within a preset normal range, and generating, based on a result of the determination, an abnormality determination mask, threshold values for the
(Continued)

plurality of feature amounts, in order to detect an abnormality of the radio waves being set in the abnormality determination mask.

10 Claims, 7 Drawing Sheets

(58) Field of Classification Search
USPC .................................................. 455/67.11
See application file for complete search history.

(56) References Cited

U.S. PATENT DOCUMENTS

| | | | |
|---|---|---|---|
| 2009/0145232 A1* | 6/2009 | Suginouchi | G01S 7/536 |
| | | | 73/597 |
| 2011/0165851 A1 | 7/2011 | Harada et al. | |
| 2012/0021710 A1 | 1/2012 | Tsukamoto et al. | |
| 2016/0299182 A1 | 10/2016 | Tsukamoto et al. | |
| 2019/0246982 A1* | 8/2019 | Mackellar | A61B 5/291 |
| 2021/0075657 A1 | 3/2021 | Matsuda et al. | |
| 2021/0168008 A1 | 6/2021 | Ohashi | |

FOREIGN PATENT DOCUMENTS

| | | |
|---|---|---|
| JP | 6617995 B | 12/2019 |
| WO | 2019/229813 A1 | 12/2019 |
| WO | 2020/035920 A1 | 2/2020 |

OTHER PUBLICATIONS

International Search Report for PCT Application No. PCT/JP2020/047712, mailed on Mar. 9, 2021.

Otsuji, Taichi et al., "An evaluation of propagation loss on wireless physical layer identification", IEICE Technical Report, Jul. 2018, pp. 43-49.

* cited by examiner

ABNORMALITY DETECTION APPARATUS, ABNORMALITY DETECTION METHOD AND NON-TRANSITORY COMPUTER READABLE MEDIUM This application is a National Stage Entry of PCT/JP2020/047712 filed on Dec. 21, 2020, which claims priority from Japanese Patent Application 2020-034621 filed on Mar. 2, 2020, the contents of all of which are incorporated herein by reference, in their entirety.

TECHNICAL FIELD

The present disclosure relates to an abnormality detection apparatus, an abnormality detection method, and an abnormality detection program.

BACKGROUND ART

Radio communications using radio waves are used in a variety of fields. Among such communications, especially important communications such as police radio communications and railway radio communications are called important radio communications. Since interference with important radio communications can lead to life-threatening situations, it is extremely important to detect (monitor) abnormalities in an emission state of radio waves used for these communications.

Patent Literature 1 discloses a technique for estimating a cause of a radio wave reception failure which is repeated periodically in association with activities of humans and machines. In Patent Literature 1, a periodic abnormality cause estimation model is constructed by using radio wave information, positional information, radio wave information, spatial information, and peripheral information accumulated in the past during a periodic abnormality time and during a normal time as input data and using a cause of occurrence of the periodic abnormality as teacher data. In an actual operation, a cause of an occurrence of a periodic abnormality in a current state is estimated based on the periodic abnormality cause estimation model using the positional information, radio wave information, spatial information, and peripheral information when the periodic abnormality is detected as the input data.

CITATION LIST

Patent Literature

Patent Literature 1: Japanese Patent No. 6617995

SUMMARY OF INVENTION

In order to estimate the cause of periodically repeated radio wave reception failures, in Patent Literature 1, a model that can estimate a cause of a failure and the positional information, the radio information, the spatial information, and the peripheral information when the failure occurs, based on accumulated information of past radio wave information, and then abnormality detection is performed. On the other hand, in the case of monitoring a radio wave emission state, it is difficult to determine whether or not an abnormality has occurred by supervised learning as in the case of Patent Literature 1, because a failure which is due to an abnormality is difficult to predict and classify often occurs.

Normally, when abnormality detection is performed on a radio wave emission state, a threshold value is set for a certain reception level of radio waves, and a radio wave whose reception level exceeds the threshold value is determined to be abnormal. The threshold value of the reception level defined for each frequency of the radio waves is called a spectrum mask. There is no fixed algorithm for a method of creating the spectrum mask, and personal factors greatly contribute to its creation. For this reason, personal factors also contribute to the detection of an abnormality of radio waves, and thus there is a problem that a uniform determination of an abnormality cannot be made.

Further, since it is determined that there is an abnormality only when the reception level exceeds a value of the spectrum mask, it is not determined that there is an abnormality when the reception level is low or when an abnormality occurs in a feature amount other than the reception level.

In view of the above-described problem, an object of the present disclosure is to provide an abnormality detection apparatus, an abnormality detection method, and an abnormality detection program which can uniformly and multilaterally determine that there is an abnormality in a radio wave emission state.

In an example aspect of the present disclosure, an abnormality detection apparatus according to the example embodiment includes: a reception unit for receiving radio waves; a feature amount extraction unit for extracting a plurality of feature amounts in a predetermined frequency band from the received radio waves; a recording unit for recording the plurality of extracted feature amounts and the frequency band in association with each other; and a processing unit for acquiring a plurality of feature amounts in a predetermined range from the plurality of accumulated feature amounts, determining whether or not the acquired feature amounts fall within a preset normal range, and generating, based on a result of the determination, an abnormality determination mask, threshold values for the plurality of feature amounts, in order to detect an abnormality of the radio waves being set in the abnormality determination mask.

In another example aspect of the present disclosure, an abnormality detection method includes: receiving radio waves; extracting a plurality of feature amounts in a predetermined frequency band from the received radio waves; recording the plurality of extracted feature amounts and the frequency band in association with each other; and acquiring a plurality of feature amounts in a predetermined range from the plurality of accumulated feature amounts, determining whether or not the acquired feature amounts fall within a preset normal range, and generating, based on a result of the determination, an abnormality determination mask, threshold values for the plurality of feature amounts, in order to detect an abnormality of the radio waves being set in the abnormality determination mask.

In another example aspect of the present disclosure, an abnormality detection program causes a computer to execute processing of: receiving radio waves; extracting a plurality of feature amounts in a predetermined frequency band from the received radio waves; recording the plurality of extracted feature amounts and the frequency band in association with each other; and acquiring a plurality of feature amounts in a predetermined range from the plurality of accumulated feature amounts, determining whether or not the acquired feature amounts fall within a preset normal range, and generating, based on a result of the determination, an abnormality determination mask, threshold values for the plurality of feature amounts, in order to detect an abnormality of the radio waves being set in the abnormality determination mask.

According to the present disclosure, it is possible to provide an abnormality detection apparatus, an abnormality detection method, and an abnormality detection program which can uniformly and multilaterally determine that there is an abnormality in a radio wave emission state.

EXAMPLE EMBODIMENT

Figure 1:
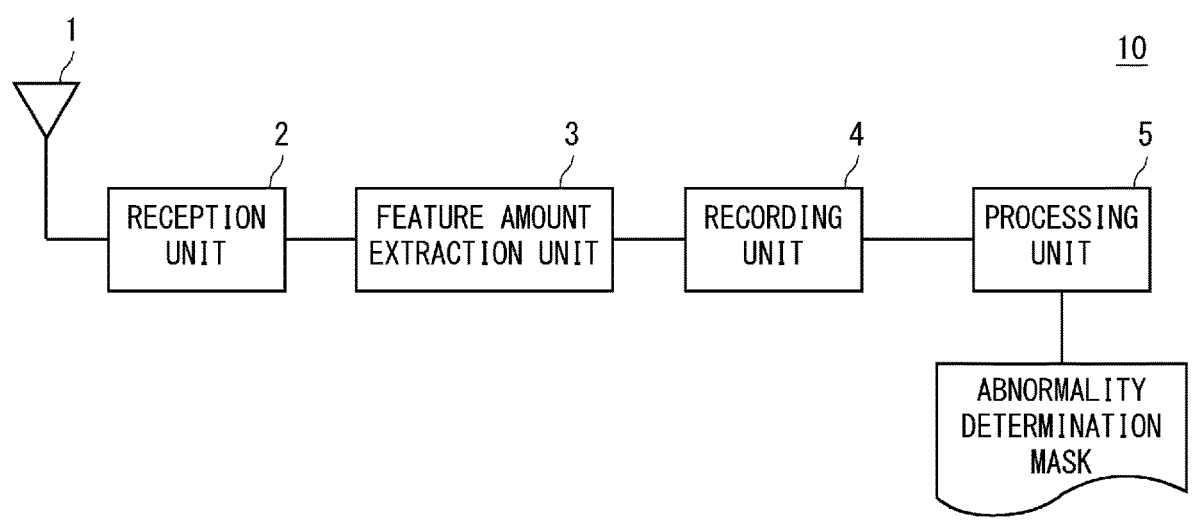
FIG. 1 shows a configuration of an abnormality detection apparatus according to an example embodiment.

Example embodiments of the present disclosure will now be described with reference to the drawings. For clarity of explanation, the following description and drawings have been omitted and simplified as appropriate.

Further, each element described in the drawing as a functional block for performing various processes can be composed of a CPU, a memory, and other lines in terms of hardware. The present disclosure can also be implemented by causing a Central Processing Unit (CPU) to execute a computer program for any processing. Accordingly, it will be understood by those skilled in the art that these functional blocks can be implemented in various forms by hardware only, software only, or a combination thereof, and are not limited to any of them.

The above program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W (Read Only Memory), and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The example embodiment relates to, for example, a technique for detecting an abnormality in a radio wave emission state. An abnormality detection apparatus according to the example embodiment includes: a reception unit for receiving radio waves; a feature amount extraction unit for extracting a plurality of feature amounts in a predetermined frequency band from the received radio waves; a recording unit for recording the plurality of extracted feature amounts and the frequency band in association with each other; and a processing unit for acquiring a plurality of feature amounts in a predetermined range from the plurality of accumulated feature amounts, determining whether or not the acquired feature amounts fall within a preset normal range, and generating, based on a result of the determination, an abnormality determination mask, threshold values for the plurality of feature amounts, in order to detect an abnormality of the radio waves being set in the abnormality determination mask.

According to the example embodiment, the abnormality determination mask can be generated by unsupervised machine learning. In the abnormality determination mask, threshold values related to a plurality of feature amounts used as determination criteria for detecting an abnormality of radio waves are set. When abnormality detection is performed on the radio wave emission state, the generated abnormality determination mask can be used to eliminate personal factors and perform multilateral abnormality detection using the plurality of feature amounts of the radio waves as determination criteria.

A specific configuration example of the abnormality detection apparatus according to the example embodiment will be described below. First, a configuration of the abnormality detection apparatus that generates an abnormality determination mask for detecting an abnormality in a radio wave will be described. FIG. 1 shows a configuration of the abnormality detection apparatus according to the example embodiment as a functional block. As shown in FIG. 1, an abnormality detection apparatus 10 includes an antenna 1, a reception unit 2, a feature amount extraction unit 3, a recording unit 4, and a processing unit 5. In the example shown in FIG. 1, processing for generating an abnormality determination mask from a plurality of feature amounts related to an intensity of radio waves is executed.

The antenna 1 receives the radio waves, converts them into electric signals, and transmits them to the reception unit 2. The reception unit 2 amplifies the electric signals from the antenna 1 to an appropriate size. The feature amount extraction unit 3 extracts a plurality of feature amounts in any frequency band from the electric signals amplified by the reception unit 2, and transmits them to the recording unit 4. Here, it is assumed that the plurality of feature amounts related to a reception level and a radio wave intensity of an Amplitude Probability Distribution (hereinafter referred to as APD) are extracted as the plurality of feature amounts.

The APD is a percentage of amplitudes of a specific magnitude of the received signal that occurred within a predetermined period of time. In the APD measurement, frequency band components of the signal are analyzed, and a probability that the magnitude of each frequency band component exceeds a predetermined threshold value within the predetermined period of time (the probability is also referred to as amplitude probability or simply time rate) is measured, and a relationship between the reception level and an occurrence rate is shown in one graph.

A period of time longer than a length of a measured transmission time where signals are continuous for each band may be set as the period of time in which the APD is to be calculated. For example, about twice the length of one transmission time of the signal transmitted in the target band may be set as the period of time in which the APD is to be calculated. When a plurality of signals having different transmission times are measured in the target band, the longest period of time may be used as the period of time in which the APD is to be calculated.

The recording unit 4 records and stores a plurality of feature amounts (frequency spectrum, APD, etc.) related to a radio wave intensity extracted by the feature amount extraction unit 3. The processing unit 5 generates an abnormality determination mask based on various feature amounts accumulated in the recording unit 4. Here, the abnormality determination mask includes two examples of a "multidimensional feature amount mask" and a "multidimensional abnormality determination mask".

The multidimensional feature mask is a mask that sets a boundary surface (a threshold value) between a normal range and an abnormal range in a multidimensional vector space in which a plurality of feature amounts related to the intensity of radio waves are used as one vector as a determination criterion for detecting an abnormality of the radio waves.

The multidimensional abnormality determination mask is a mask in which threshold values of the plurality of feature amounts related to the intensity of radio waves are individually set. The threshold values of the feature amounts are used as the determination criteria for detecting an abnormality of the radio waves.

Figure 2:
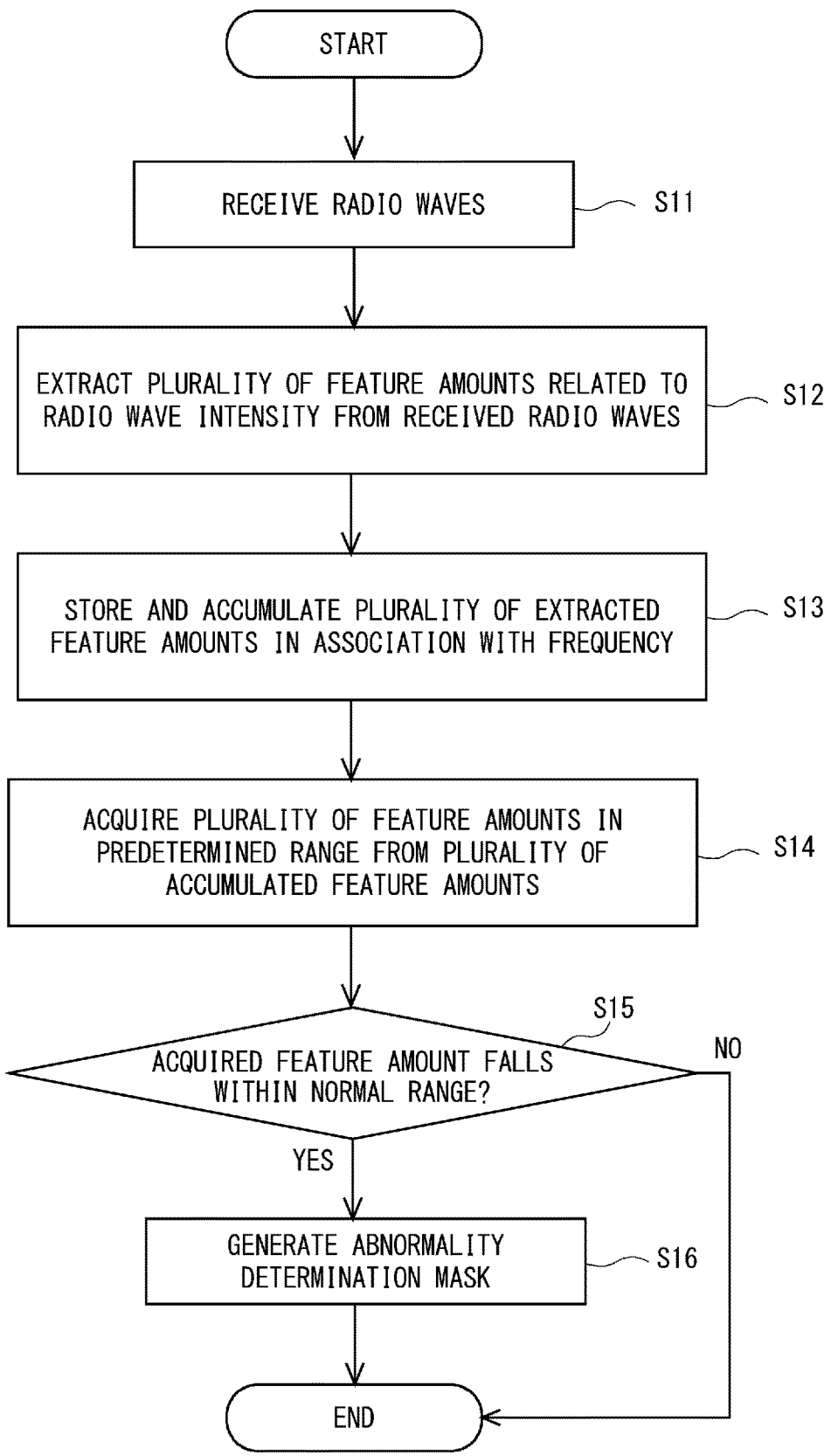
FIG. 2 is a flowchart for explaining processing for generating an abnormality determination mask executed by the abnormality detection apparatus of FIG. 1.

Next, processing for generating the abnormality determination mask, which is executed by the abnormality detection apparatus of FIG. 1, will be described with reference to the flowchart of FIG. 2. Here, two examples of generating the multidimensional abnormality determination mask and the multidimensional feature amount mask as the abnormality determination masks will be described. First, radio waves are received by the antenna 1 (Step S11). The received radio waves are converted into electric signals and transmitted to the reception unit 2.

The plurality of feature amounts (reception level, APD) related to the radio wave intensity in a predetermined frequency band are extracted from the received radio waves (Step S12). As the predetermined frequency range, a range of a predetermined frequency width can be selected centering on a frequency band of radio waves used for radio communication. For example, when the frequency of a signal used for railway radio is 400 MHz, a range of 400 MHz±f (f is any frequency width) is selected as a predetermined frequency unit. The plurality of feature amounts extracted in Step S12 are stored and accumulated in the recording unit 4 in association with the frequency band (Step S13).

Next, the plurality of feature amounts in the predetermined range are acquired from the plurality of accumulated feature amounts (Step S14). In the example embodiment, the plurality of acquired feature amounts are used to generate the abnormality determination mask with a threshold value set by unsupervised machine learning. Here, as an algorithm of unsupervised machine learning, for example, One-Class SVM (Support Vector Machine) which is a method of outlier detection is used.

In One-Class SVM, a set of normal data pieces for a class is learned, and an identification boundary (a threshold value) is determined, so that outliers are detected based on that boundary. Specifically, it is determined whether or not the acquired feature amount falls within the normal range by using the normal data for determining whether or not the feature amount is normal (Step S15). If it is determined that the acquired feature amount falls within the normal range (YES in Step S15), the level of the threshold value is changed according to a result of the determination, and the abnormality determination mask is generated (Step S16).

To generate the multidimensional abnormality determination mask, it is determined whether or not each of the plurality of feature amounts falls within a preset normal range, and a mask in which threshold values are individually set is generated by unsupervised machine learning.

On the other hand, to generate the multidimensional feature mask, it is determined whether or not each of the acquired feature amounts exceeds the threshold values of the normal range and the abnormal range in the multidimensional vector space including the plurality of feature amounts as one vector, and a threshold value in the multidimensional vector space is set.

If it is determined in Step S15 that the feature amount does not fall within the normal range, the level of the threshold value is not changed and the processing is ended.

Figure 3:
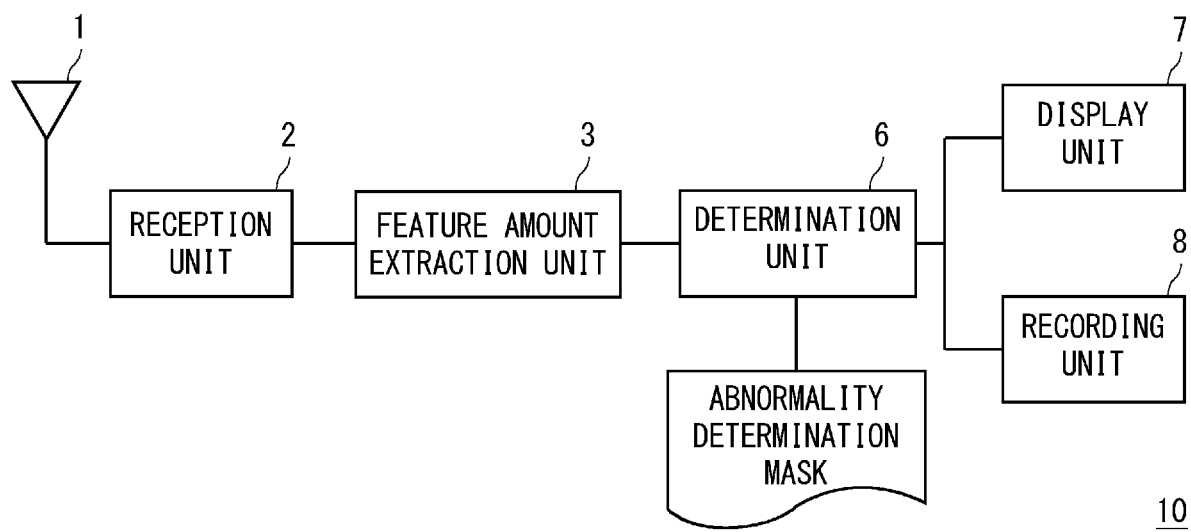
FIG. 3 shows a configuration of the abnormality detection apparatus according to the example embodiment.

Next, the abnormality detection apparatus for detecting an abnormality by using the abnormality determination mask generated by the above-described method in a radio wave emission state will be described. FIG. 3 shows a configuration of the abnormality detection apparatus 10 according to the example embodiment as a functional block. Overlapping components of the abnormality detection apparatuses 10 shown in FIGS. 1 and 3 may be used in common, and can be configured as one apparatus.

As shown in FIG. 3, the abnormality detection apparatus 10 includes an antenna 1, a reception unit 2, a feature amount extraction unit 3, a determination unit 6, a display unit 7, and a recording unit 8. In the example shown in FIG. 3, an abnormality of the radio waves is detected using the abnormality determination mask generated by the above-described method. The antenna 1 receives radio waves, converts them into electric signals, and transmits them to the reception unit 2. The reception unit 2 amplifies the electric signals from the antenna 1 to an appropriate size.

The feature amount extraction unit 3 extracts a plurality of feature amounts (reception level, APD) related to the radio wave intensity in any frequency band from the electric signal amplified by the reception unit 2, and transmits them to the determination unit 6. The determination unit 6 determines whether or not the received radio waves have an abnormality by using the abnormality determination mask generated by the processing unit 5, and transmits a result of detection indicating the presence or absence of the abnormality to the display unit 7 and the recording unit 8. The display unit 7 displays the result of the detection. The recording unit 8 records and accumulates the result of the detection.

Figure 4:
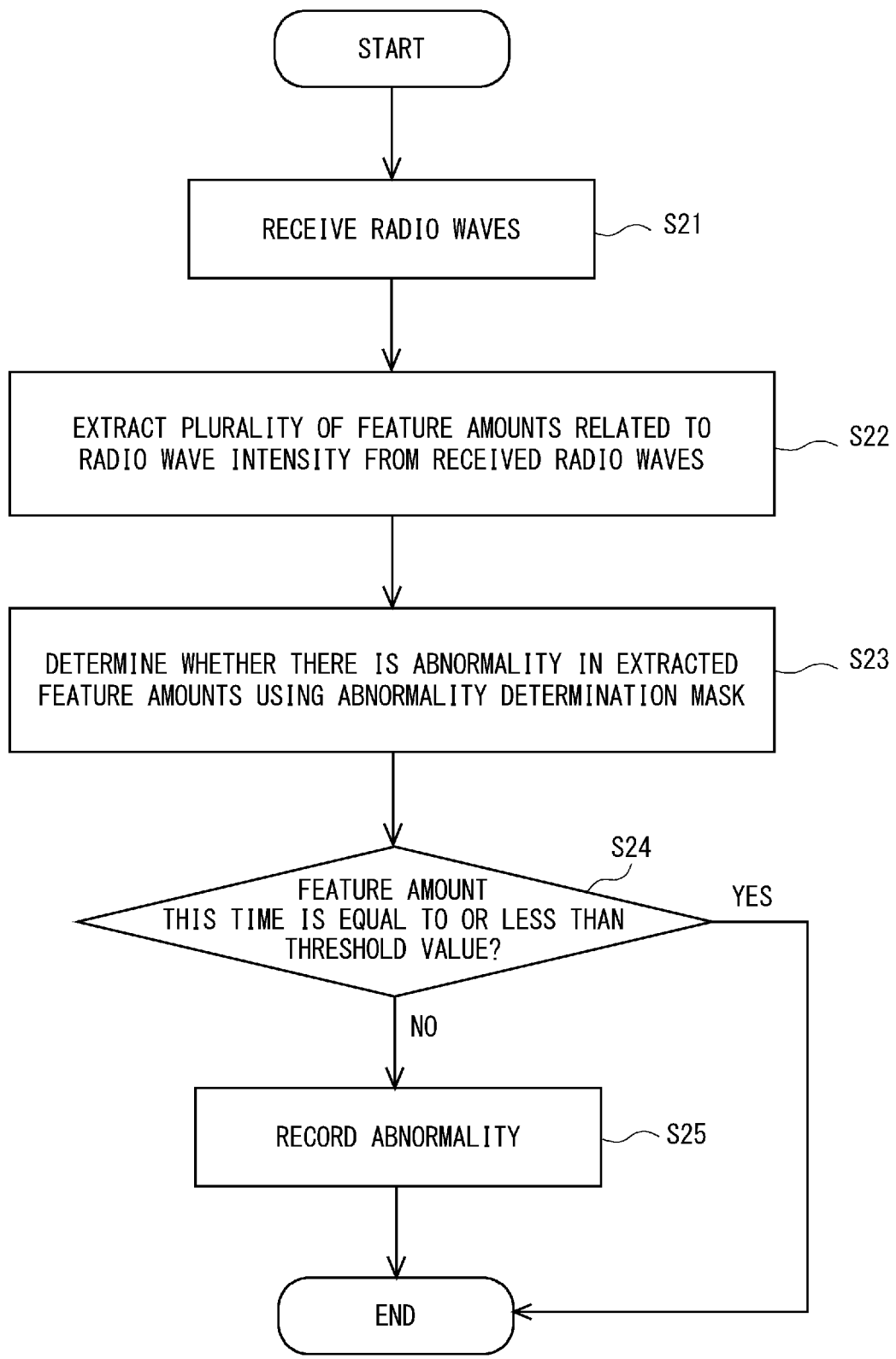
FIG. 4 is a flowchart for explaining processing for detecting a radio wave abnormality executed by the abnormality detection apparatus of FIG. 3 by using the abnormality determination mask generated in the example embodiment.

Next, abnormality detection processing of radio waves using the abnormality determination mask, which is executed by the abnormality detection apparatus of FIG. 3, will be described with reference to the flowchart of FIG. 4. Here, two examples of the abnormality detection processing using the multidimensional abnormality determination mask and the multidimensional feature amount mask as the abnormality determination mask will be described. In FIG. 4, the processing of Steps S21 and S22 are the same as the processing of Steps S11 and S12 in FIG. 2, respectively, and therefore the description of the processing of Steps S21 and S22 is omitted.

In Step S23, abnormality determination using the abnormality determination mask is performed on the extracted plurality of feature amounts. Specifically, it is determined whether or not the feature amount extracted this time is equal to or less than the threshold value set in the abnormality determination mask (Step S24).

In the case of abnormality determination by using the multidimensional abnormality determination mask, it is determined whether or not the plurality of feature amounts extracted this time are less than or equal to the threshold values of the respective feature amounts set in the multidimensional abnormality determination mask. If at least one of the plurality of feature amounts extracted from the received radio waves exceeds the threshold value set in the multidimensional abnormality determination mask, the determination unit 6 proceeds to Step S24 "NO".

On the other hand, in the abnormality determination by using the multidimensional feature amount mask, it is determined whether or not the feature amount extracted from the received radio waves this time is less than or equal to the threshold value set in the multidimensional feature amount mask. If the feature amount this time exceeds the threshold value set in the multidimensional feature amount mask, the determination unit 6 proceeds to Step S24 "NO".

If it is determined that the received radio waves are abnormal, a result of the detection indicating a radio wave abnormality is displayed on the display unit 7, and the detected abnormality is recorded in the recording unit 8 (Step S25).

On the other hand, if the feature amount this time is less than or equal to the threshold value set in the abnormality determination mask (YES in Step S24), it is determined that the received radio waves are normal, and a result of the detection indicating that the radio waves are normal is displayed on the display unit 7, and the processing is ended.

Figure 5:
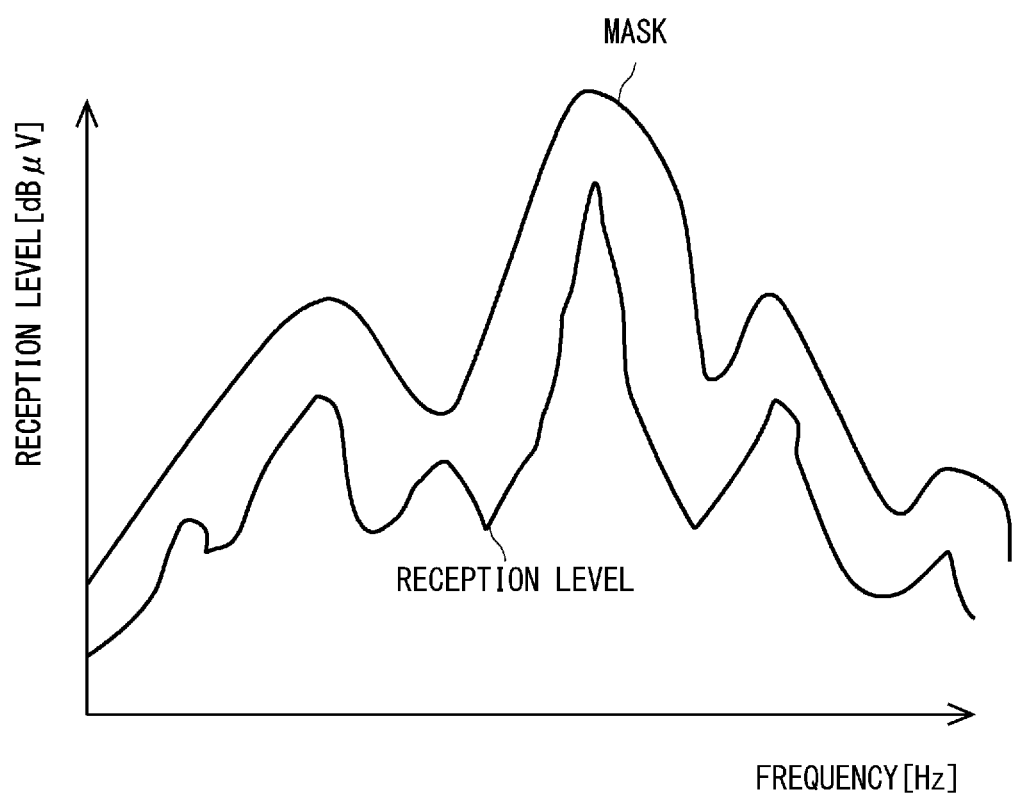
FIG. 5 is a diagram for explaining the abnormality determination mask generated in the example embodiment.
Figure 7:
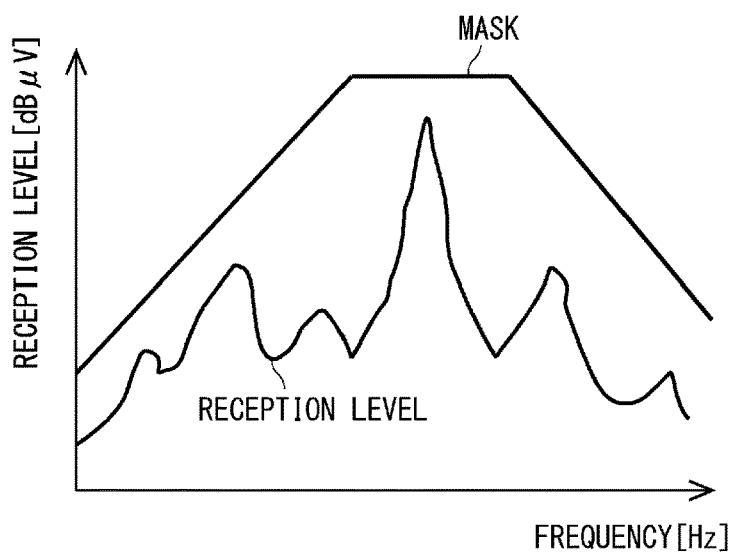
FIG. 7 is a diagram for explaining a spectrum mask according to a comparative example.
Figure 7:
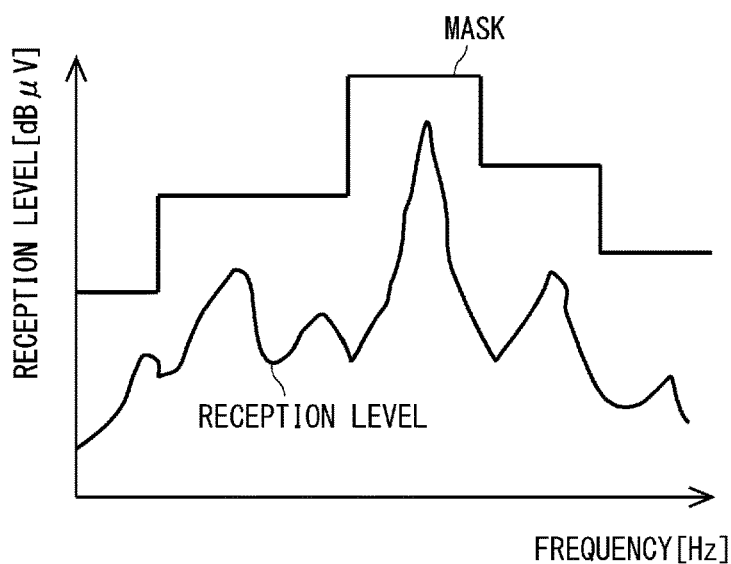
Figure 7:
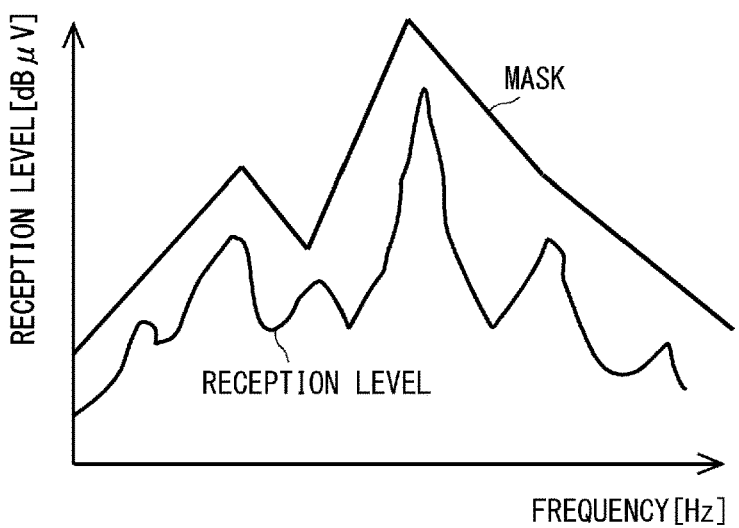

Here, the abnormality determination mask generated according to the example embodiment will be described with reference to FIG. 5. As described above, the abnormality determination mask includes the multidimensional abnormality determination mask and the multidimensional feature amount mask. However, in FIG. 5, a mask used for abnormality determination of the reception level of radio waves is shown for explanation. FIG. 5 shows a mask used for abnormality determination of the reception level of radio waves in the abnormality determination mask obtained according to the example embodiment. FIG. 7 shows, as a comparative example, a spectrum mask in which the threshold values of the reception levels are artificially defined for respective frequencies of radio waves. In FIGS. 5 and 7, the horizontal axis represents the frequency (Hz) and the vertical axis represents reception level (dB μV).

In FIG. 7, different spectrum masks are shown in the upper, middle, and lower rows. As shown in FIG. 7, the shape of the mask varies depending on a creator, and thus there is a problem that it is not possible to make a uniform determination in detecting abnormal radio waves. On the other hand, as shown in FIG. 5, in the example embodiment, a mask with a threshold value set by unsupervised machine learning is generated. In this manner, it is possible to generate a mask for performing abnormality detection of radio waves excluding personal factors.

In addition, according to the example embodiment, the threshold values of the plurality of feature amounts of the radio waves are set in the multidimensional abnormality determination mask. In the above example, the threshold values of the reception level and the APD are set in the multidimensional abnormality determination mask. On the other hand, in the multidimensional feature amount mask, a threshold value in the multidimensional vector space is set by using the plurality of feature amounts of the radio waves. In the above example, the boundary surface (the threshold value) between the normal range and the abnormal range in the multidimensional vector space in which the reception level and the APD are used as one vector is set in the multidimensional feature amount mask. By using such an abnormality determination mask for determining that there is an abnormality of the radio wave emission state, a plurality of feature amounts can be used as the determination criteria.

Figure 6:
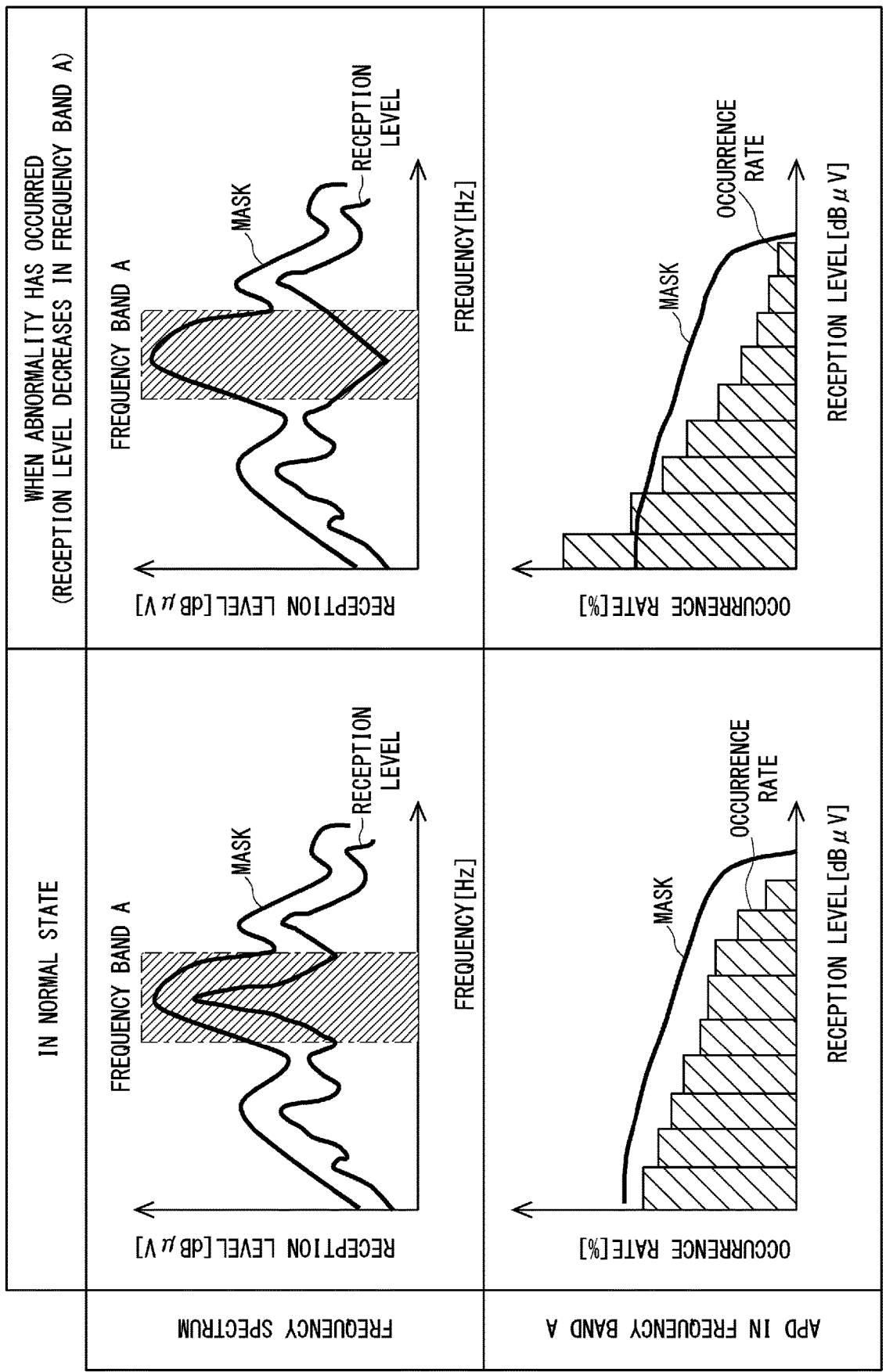
FIG. 6 is a diagram for explaining an example of abnormality detection using the abnormality determination mask generated in the example embodiment.

FIG. 6 is a diagram for explaining an example of abnormality detection using the abnormality determination mask according to the example embodiment. Here, for the purpose of explanation, an abnormality detection example using a mask used for the abnormality determination of the reception level of the radio waves and an abnormality detection example using a mask used for the abnormality determination of the APD are separately shown. The left column of FIG. 6 shows a detection result in the normal state, and the right column shows a detection result when an abnormality has occurred. The upper row of FIG. 6 is a detection result obtained by using the frequency spectrum, and the lower part is a result of detecting the APD in a frequency band A.

As shown in the upper row of FIG. 6, in the mask defining the threshold value of the reception level, only the radio waves having the reception level larger than the threshold value are determined to be abnormal. Therefore, when the reception level of the radio waves is larger than the threshold value, the radio waves are determined to be abnormal, whereas when the reception level of the radio waves is smaller than the threshold value, the radio waves are not determined to be abnormal. Thus, for example, when the reception level decreases in the frequency band A, the radio waves are not determined to be abnormal.

However, in the abnormality determination of the radio waves using the abnormality determination mask according to the example embodiment, the abnormality of the radio waves is determined not only by the reception level but also by the APD. As the reception level decreases, the rate at which small reception levels occurs generally increases in the APD. Referring to the lower row of FIG. 6, when an abnormality occurs, the APD in the frequency band A exceeds the threshold value of the mask, and thus the radio waves are determined to be abnormal.

As described above, according to the example embodiment, when the feature amount extracted from the received radio waves exceeds the threshold value set in the abnormality determination mask, it can be determined that the received radio waves are abnormal, so that an abnormality of the radio waves can be detected multilaterally. Thus, even when the reception level is lower than that in the normal state or when an abnormality occurs in the feature amount other than the reception level, which cannot be detected by abnormality determination using only the reception level, the abnormality can be detected.

The present disclosure is not limited to the above-described example embodiment, and may be suitably modified without departing from the spirit. The method of generating the abnormality determination mask is not limited to the above-described method, and various techniques related to machine learning can be used as appropriate. The above-described abnormality detection technique can be applied, for example, to radio wave monitoring, proximity detection of a mobile body emitting radio waves such as a drone, and failure detection of a radio apparatus. The feature amount of the radio wave may be a feature amount other than a feature amount related to radio wave intensity, such as an azimuth angle of arrival.

Although the present disclosure has been described with reference to the example embodiment, the present disclosure is not limited by the above. The configuration and details of the present disclosure may be modified in various ways that will be understood by those skilled in the art within the scope of the invention.

This application claims priority on the basis of Japanese Patent Application No. 2020-034621, filed Mar. 2, 2020, the entire disclosure of which is incorporated herein by reference.

REFERENCE SIGNS LIST

10 ABNORMALITY DETECTION APPARATUS
1 ANTENNA
2 RECEPTION UNIT
3 FEATURE AMOUNT EXTRACTION UNIT
4 RECORDING UNIT
5 PROCESSING UNIT
6 DETERMINATION UNIT
7 DISPLAY UNIT
8 RECORDING UNIT

What is claimed is:

1. An abnormality detection apparatus comprising:
a receiver which receives radio waves;
at least one memory storing instructions; and
at least one processor configured to execute the instructions to:
extract a plurality of feature amounts in a predetermined frequency band from the received radio waves;
accumulate the extracted plurality of feature amounts and the frequency band in association with each other;
acquire the accumulated plurality of feature amounts;
determine whether or not the acquired plurality of feature amounts fall within a preset normal range; and
generate, based on a result of the determination, an abnormality determination mask in which threshold values for the plurality of feature amounts for detecting an abnormality of the radio waves are set.

2. The abnormality detection apparatus according to claim 1, wherein
the at least one processor is further configured to execute the instructions to determine whether or not each of the acquired plurality of feature amounts falls within the preset normal range, and generates, as the abnormality determination mask, a multidimensional abnormality determination mask in which the threshold values for the plurality of feature amounts are respectively set.

3. The abnormality detection apparatus according to claim 1, wherein
the at least one processor is further configured to execute the instructions to determine whether or not each of the acquired plurality of feature amounts exceeds threshold values between the preset normal range and an abnormal range in a multidimensional vector space including the plurality of feature amounts as one vector, and generate a multidimensional feature amount mask as the abnormality determination mask, a threshold value in the multidimensional vector space being set in the multidimensional feature amount mask.

4. The abnormality detection apparatus according to claim 1, wherein
the preset normal range is set by learning a set of normal data pieces for one class and determining an identification boundary.

5. The abnormality detection apparatus according to claim 1, wherein
the at least one processor is further configured to execute the instructions to determine whether or not there is an abnormality in the received radio waves by using the abnormality determination mask.

6. The abnormality detection apparatus according to claim 5, wherein
the at least one processor is further configured to execute the instructions determines that the received radio waves are abnormal when the feature amount extracted from the received radio waves exceeds the threshold value set in the abnormality determination mask.

7. The abnormality detection apparatus according to claim 1, wherein
the plurality of feature amounts include a reception level and an amplitude probability distribution.

8. The abnormality detection apparatus according to claim 7, wherein
the amplitude probability distribution is obtained by calculating a percentage of an amplitude of a predetermined magnitude occurred within a time longer than a measured transmission time where signals are continuous for each target band of the radio waves.

9. An abnormality detection method performed by a computer and comprising:
receiving radio waves;
extracting a plurality of feature amounts in a predetermined frequency band from the received radio waves;
accumulating the extracted plurality of feature amounts and the frequency band in association with each other;
acquiring the accumulated plurality of feature amounts;
determining whether or not the acquired plurality of feature amounts fall within a preset normal range; and
generating, based on a result of the determination, an abnormality determination mask in which threshold values for the plurality of feature amounts for detecting an abnormality of the radio waves are set.

10. A non-transitory computer readable medium storing a program executable by a computer to execute processing comprising:
extracting a plurality of feature amounts in a predetermined frequency band from received radio waves;
accumulating the extracted plurality of feature amounts and the frequency band in association with each other;
acquiring the accumulated plurality of feature amounts;
determining whether or not the acquired plurality of feature amounts fall within a preset normal range; and
generating, based on a result of the determination, an abnormality determination mask in which threshold values for the plurality of feature amounts for detecting an abnormality of the radio waves are set being set.

* * * * *